March 21, 1933.  H. SCHANTZ  1,902,047

MOLDING TOOL FOR MOLDING MACHINES

Filed July 28, 1932

INVENTOR
HENRY SCHANTZ

BY John A. Bommhardt

ATTORNEY

Patented Mar. 21, 1933

1,902,047

UNITED STATES PATENT OFFICE

HENRY SCHANTZ, OF NEW CASTLE, PENNSYLVANIA

MOLDING TOOL FOR MOLDING MACHINES

Application filed July 28, 1932, Serial No. 625,482, and in Germany October 7, 1931.

The present invention relates to new and useful improvements on molding tools, especially for the type of molding machines particularly adapted for molding ceramic articles.

The principal object is to provide means whereby the surplus material may be cut sharply from the article being molded.

Another object is to provide means whereby the one-sided pressure on the mold is overcome by the use of a pressing roller which holds the mold firmly in the potters wheel.

Further objects and advantages may be noted from the following specification and its accompanying drawing, in which:—

Figure 1:
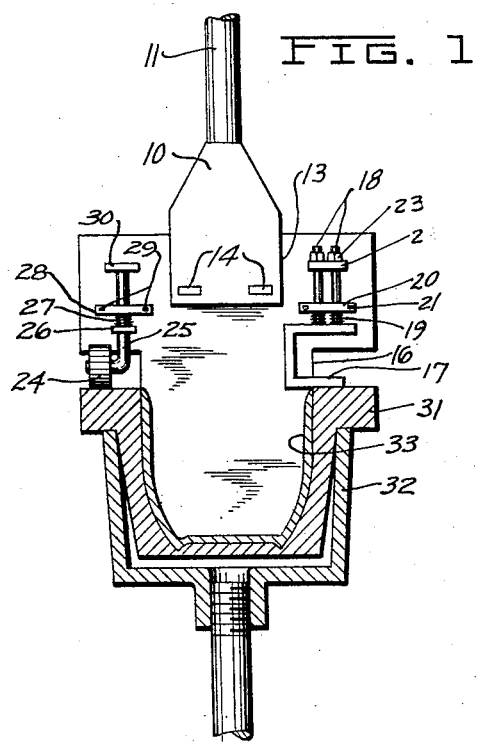
Figure 1 is a sectional view partly in elevation of molding tools and machine.
Figure 2:
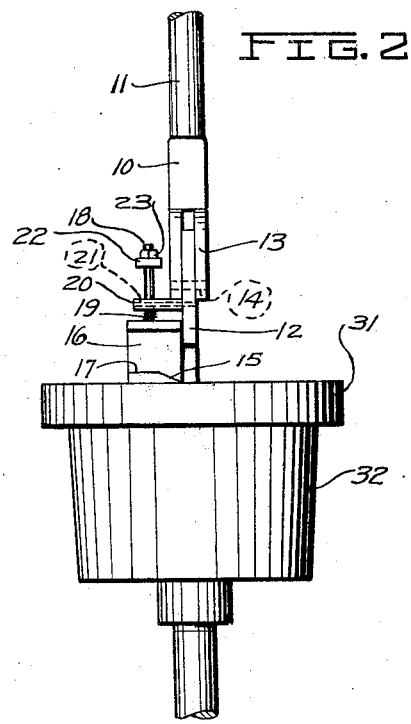
Fig. 2 is a side elevation of a molding tool and machine.
Figure 3:
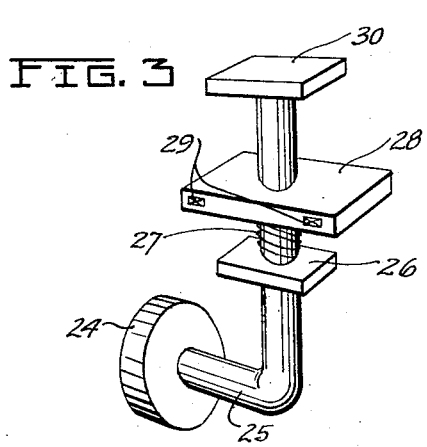
Fig. 3 is a perspective view of a pressing roller.
Figure 4:
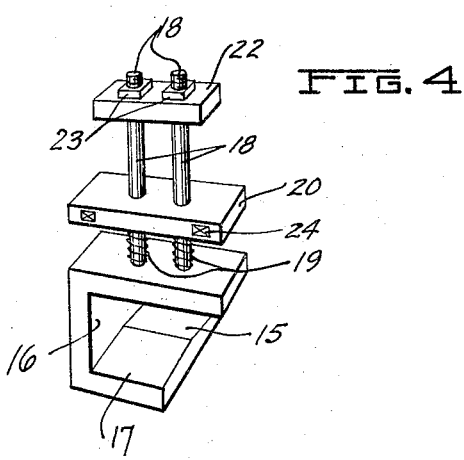
Fig. 4 is a perspective view of a trimming knife.

Referring specifically to the drawing—a molding tool carrier 10 mounted on shaft 11 retains a molding tool 12 within its slotted base 13 by means of pins 14.

Mounted on one side of molding tool 12 is a trimming knife 15 which is angular in shape with varying degrees between wall 16 and knife base 17, according to the predetermined form to be molded.

Knife 15 has a plurality of bolts 18 mounted through its top surface and projecting through springs 19 and a guiding last 20 attached to molding tool 12 by pins 21; the tops of bolts 18 being held together through traverse 22 by nuts 23, said springs 19 giving an elasticity to the movement of the knife 15.

On the opposite side of the molding tool 12 is a pressing roller 24 mounted rotatably on a bent shaft 25, said shaft projecting through traverse 26, spring 27 and guiding last 28 attached to molding tool 12 by pins 29 and extending vertically above the top of said guiding last 28 and ending in a flat head 30.

The roller 24 also has a yielding movement due to the spring 27, said roller pressing against the edge of the mold 31 thus balancing the one-sided movement caused by the pressure of the knife 15 and holding the plaster mold 31 firm in the potters wheel 32.

As the molding tool 12 shapes the vessel 33 and the surplus material is pressed to the outside of plaster mold 31, the knife 15 cuts the surplus material sharply from the top edge of the vessel 33, or from the sides depending upon the predetermined form of the vessel 33. The knife 15 sliding along the edge of the plaster mold 31 causes a one sided pressure and would lift the said plaster mold 31 up slightly but the roller 24 pressing down overcomes this lifting tendency of the knife 15, and holds the plaster mold 31 firmly within the potters wheel 32. Either the shaft 11 and the potters wheel may be rotated by any suitable means.

This invention of mine may be attached to any molding tool, such as for illustration on my molding machine U. S. Patent No. 1,826,577, in which the molding tool (16') is turning while the mold (12) is stationary, or also to molding tools which are stationary and the mold is turning.

I claim:

1. In a molding machine the combination of a mold and a shaping tool therein, the mold and tool being relatively rotatable, a trimming blade carried by the tool and spring pressed against the rim of the mold, and means at the opposite side of the tool to balance the spring pressure of the knife.

2. The combination stated in claim 1, the tool having supporting guides for the knife.

3. In a molding machine the combination of a mold and a shaping tool projecting into the same, the mold and tool being relatively rotatable, guides on the tool at opposite sides of the axis thereof, a trimming blade carried by one guide in yielding contact with the rim of the mold, and a yielding roller carried by the other guide, in contact with said rim.

4. A molding machine comprising a mold and a shaping tool extending therein, said mold and tool being relatively rotatable, and a spring pressed trimming knife carried by the tool in position to trim the material being molded, at the rim of the mold, and a spring pressed roller carried by the tool opposite to the knife and bearing on the rim of the mold.

In testimony whereof, I do affix my signature.

HENRY SCHANTZ.